United States Patent

Schmidt et al.

(10) Patent No.: US 9,481,330 B2
(45) Date of Patent: Nov. 1, 2016

(54) METHOD FOR REDUCING LINEAR DISTORTION IN A POWER INTERFACE FOR A MOTOR VEHICLE

(71) Applicant: Hella KGaA Hueck & Co., Lippstadt (DE)

(72) Inventors: Franz-Josef Schmidt, Salzkotten (DE); Andreas Stumpf, Lippstadt (DE); Volker Wöβmann, Telgte (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 499 days.

(21) Appl. No.: 14/160,098

(22) Filed: Jan. 21, 2014

(65) Prior Publication Data

US 2014/0203635 A1    Jul. 24, 2014

(30) Foreign Application Priority Data

Jan. 21, 2013  (DE) .................. 10 2013 100 551

(51) Int. Cl.
*B60L 1/00* (2006.01)
*B60R 16/023* (2006.01)
*H04B 3/54* (2006.01)

(52) U.S. Cl.
CPC .......... *B60R 16/023* (2013.01); *H04B 3/548* (2013.01); *H04B 2203/5416* (2013.01); *H04B 2203/5425* (2013.01); *H04B 2203/5445* (2013.01)

(58) Field of Classification Search
CPC .............. B60R 16/023; H04B 3/5486; H04B 2203/5445; H04B 2203/5425; H04B 2203/5416
USPC .......................................... 307/9.1
See application file for complete search history.

(56) References Cited

U.S. PATENT DOCUMENTS

| | | | |
|---|---|---|---|
| 4,531,098 A | | 7/1985 | Reed |
| 5,493,583 A | * | 2/1996 | Cripps ................. H03C 3/0975 375/219 |
| 5,936,429 A | * | 8/1999 | Tomita ................... H03K 5/153 326/26 |
| 6,963,603 B1 | * | 11/2005 | Rezvani ................. H04B 3/56 370/206 |

FOREIGN PATENT DOCUMENTS

| | | |
|---|---|---|
| DE | 3936618 C2 | 1/2000 |
| DE | 102004030728 A1 | 1/2006 |

* cited by examiner

*Primary Examiner* — Jared Fureman
*Assistant Examiner* — Duc M Pham
(74) *Attorney, Agent, or Firm* — Husch Blackwell LLP

(57) ABSTRACT

A method for reducing signal distortion in the transmission of binary coded signals in a motor vehicle, preferably in a power interface, is characterized in that an edge of the binary coded signal is formed in the transmitter by adapting the frequency and phase response of a harmonic such that the signal distortion to be expected on the entire transmission line can be compensated.

10 Claims, 2 Drawing Sheets

METHOD FOR REDUCING LINEAR DISTORTION IN A POWER INTERFACE FOR A MOTOR VEHICLE

CROSS REFERENCE

This application claims priority to German Patent Application No. 10 2013 100551.9, filed Jan. 21, 2013.

TECHNICAL FIELD OF THE INVENTION

The invention relates to a method for reducing signal distortion in the transmission of binary coded signals in a motor vehicle, preferably in a power interface.

BACKGROUND OF THE INVENTION

In the transmission of binary coded signals via a power interface, line characteristics, in particular, line inductance and sensor capacitance, but also the load capacitance of other sensors (transmitters) arranged in parallel in a bus system, have a significant influence on the distortion of the signals coming into the receiver. Such distortion makes evaluation on the receiver side more difficult or even impossible under some circumstances.

Linear distortion is caused, in particular, by capacitance on the sensor side. Together with the line inductance, it forms an oscillating circuit that can cause strong linear distortion of the binary signals to be transmitted.

The capacitance on the sensor side of a power interface suppresses the coupled noise voltage and is thus unavoidable. This means that the different spectral components of the transmission signal have linear distortion in amplitude and phase on the transmission line. This has the result that, for example, a transmitted, approximately square-wave signal reaches the receiver side with more or less distortion. This makes the error-free reception of the binary signal significantly more difficult on the receiver side.

To avoid such distorting line characteristics, the transmission lines are typically "terminated" on both ends with the characteristic impedance, e.g., with 120 ohms at each end of a double circuit line.

In principle, this is also possible in so-called power interfaces. However, because the power for powering the sensor must also flow via the signal lines, terminating resistors on this order of magnitude are undesired. They lead to an increased voltage drop and an increased power loss. This is because, in an example calculation where the supply voltage on the terminals of one sensor is 5 V, the resistance is 120 ohm, and the current is 20 mA, only a voltage of 5.0 V−2.4 V=2.6 V remains for the sensor circuit. To avoid this voltage drop or to keep it small, only an attenuation resistance of a few ohms, instead of 120 ohms, can be accepted. For this reason, the design must use non-nominally tuned termination resistors. Increasing line length and the resulting increasing line inductance causes ringing or attenuated oscillation at each signal edge.

From DE 10 2004 030 728 A1, a method for reducing noise in signal transmission is known, especially in pulse-width-modulated signals. Here, for changing the edge profile when an edge to be changed is applied to an input of the device, a digitized edge profile stored in the memory is read out from the memory and converted by means of the D/A converter into an analog signal with the changed edge profile.

The task of the present invention is therefore to disclose a method for reducing linear distortion in a power interface for a motor vehicle which automatically produces an absolute minimum of the harmonics contained in the signal.

SUMMARY OF THE INVENTION

To solve this problem, an edge of the binary coded signal is formed in the transmitter by adapting the frequency and phase response of a harmonic such that the signal distortion to be expected on the entire transmission line can be compensated.

The special advantage of the invention consists in not damping the oscillating response of the transmission lines in the typical way, but instead already compensating for the oscillating response in the signal generation in the transmitter, but at the latest before the threshold circuit in the receiver.

In principle, only frequencies that are contained in the transmission signal can have distortion. If the spectrum of the transmission signal is reduced to the absolute minimum, this also reduces the complexity of the overall task.

In principle it would already be sufficient to use only a first harmonic as the carrier. In practice, however, the low edge steepness of such a sinusoidal signal would make the decoding of the binary signal shape more difficult on the receiver side. Just in terms of undesired noise emissions, however, as few harmonics as possible should be used for forming the signal.

According to one refinement of the invention, in addition to a first harmonic, the amplitude and phase of the additional harmonics used in the signal are adjusted with respect to the first harmonic, so that the frequency and phase response of the transmission line is compensated.

To avoid distortion and undesired noise transmission, the spectrum of the transmission signal is therefore first reduced to the discrete frequencies absolutely required for the edge steepness. For many power interfaces, it is already sufficient to add, for increasing the edge steepness, only the third harmonic for the carrier (unmodulated signal), for example, in addition to the first harmonic.

The carrier is therefore not generated from a square-wave signal with subsequent weakening of undesired frequency components, but instead is generated, for example, by a synthesis from the first and third harmonics.

According to a preferred embodiment of the invention, the distortion of the signals received on the receiver is rectified by a rectification circuit connected upstream of the threshold circuit.

In order to compensate for the effect of the entire transmission line on the signal shape, the amplitude and phase of the third harmonic (or additional harmonics) are set so that the desired signal shape without distortion as much as possible arrives at the threshold circuit in the receiver.

Preferably, the compensation can even include the low-pass filter for noise suppression before the threshold circuit in the receiver control unit. This allows significantly better noise suppression and more robust signal transmission.

For a low-pass response of the transmission line, for example, the signal amplitude of the third harmonic in the sensor must be raised according to the signal attenuation on the transmission line and the phase must be advanced by a measure.

Because the line characteristics in a motor vehicle are essentially known and constant with respect to a certain sensor address, in this way it can be easy to generate, despite unfavorable line characteristics on the receiver side or on the threshold circuit, a nearly ideal signal shape.

In principle, it is also sufficient to set the amplitude and phase of the harmonics being used with respect to the first harmonic in the sensor so that the distortion on the transmission line is exactly compensated. With the help of a simulation model for the transmission line, other possibly connected sensors, and the input circuit of the receiver, it is simple to form a linear overall frequency response and phase response and to generate the desired input signal for the receiver.

According to a preferred embodiment of the invention, effects of optional transmitters connected in parallel can be compensated by correspondingly allocated tables, wherein a receiver control unit can be provided that reports to the transmitter which table should be selected for the corresponding configuration.

The signal shape (edge shape) optimized in a simulation can be stored in the sensor in a small table and read out for each edge to be output and reconverted to analog with a DAC. For different line characteristics, specially adapted tables can be stored in the sensor and selected as needed.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
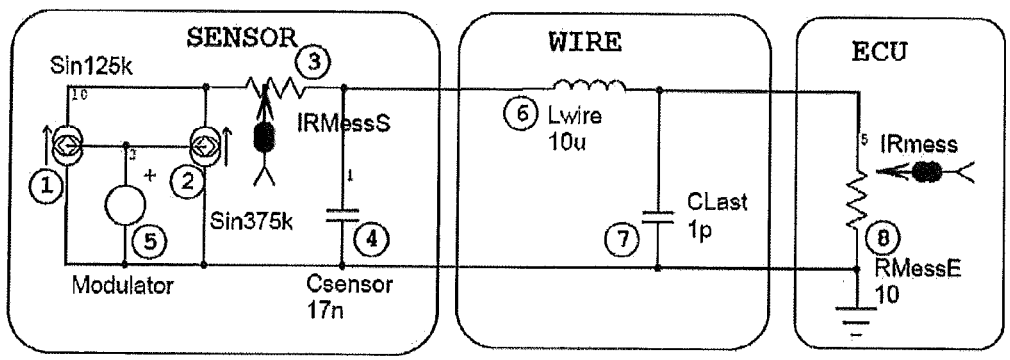
FIG. 1 is a basic wiring diagram of a simplified circuit with dimensions.

FIG. 1 shows a basic wiring diagram of a simplified circuit with dimensions. The basic circuit is reduced to the essentials.

The function and advantages of the invention will be described with reference to the basic wiring diagram and the simulated signals. The individual aspects of the basic wiring diagram will be explained in more detail below.

The power source 1 generates the first harmonic at 125 kHz. The power source 2 generates the third harmonic at 375 kHz. The total transmission power is formed by connecting the two power sources in parallel. The resistor 3 IRMessS equal to 1 mohm is used in this simulation only for the measurement of the transmission current.

The capacitor 4 Csensor is the total capacitance of the sensor. The modulator 5 modulates the two power sources by the data contents to be transmitted. These data contents are not shown in more detail. For the generation of a Manchester code, at each phase jump of the Manchester code, the phases and amplitudes of the two sinusoidal sources 1 and 2 are semi-frozen for one half the pulse period (the DAC is stopped for 4 µs each time).

Irmess is the total resistance of the entire power circuit. The receiver current can be measured on it. In this simulation example, the total line inductance 6 is 10 µH, the total line and load capacitance 7 is 1 pF, the sensor capacitance 4 is 17 nF, and the total resistance 8 in the power circuit is 10 ohm. The current through the resistor 8 (IRmess) should have the most ideal signal shape possible with respect to noise coupling and noise emission.

Figure 2:
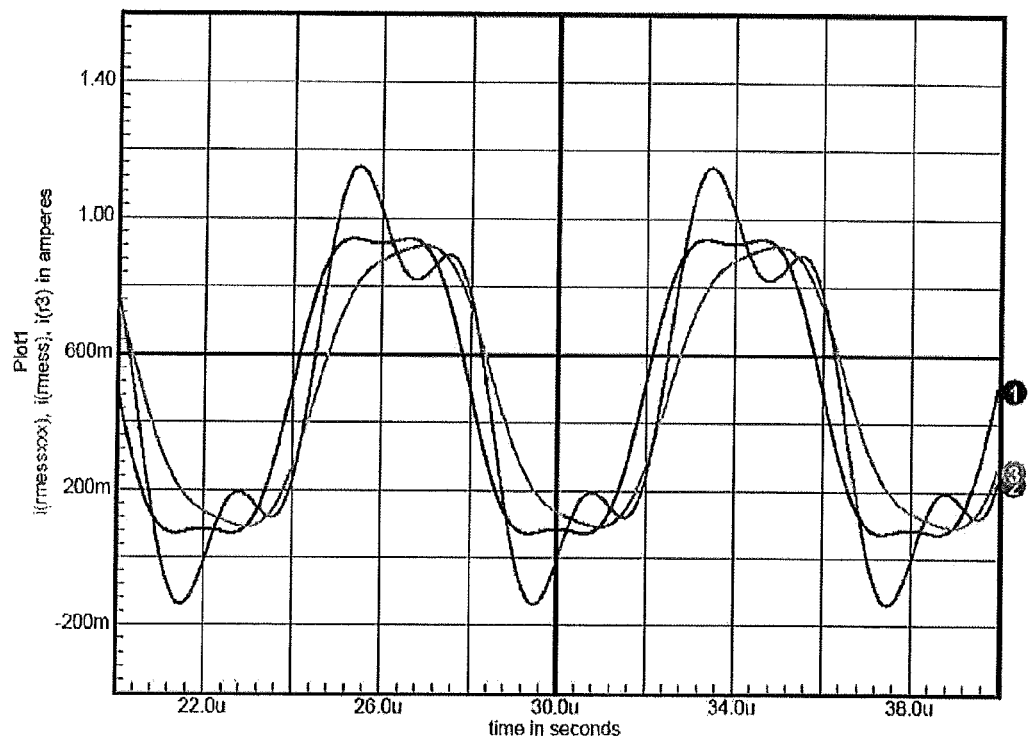
FIG. 2 is a graphic for explaining the principle problem of distorted frequency currents.

FIG. 2 shows a graphic for explaining the principle problem of distorted frequency currents. The individual curves will be explained in more detail below.

The curve 1 shows the desired unmodulated carrier signal synthesized from a 125 kHz sinusoid and a 375 kHz sinusoid described above. Ideally this signal should reach the receiver.

The curve 2 shows the distorting effect of a line inductance of 10 µH for a load capacitance of 1 pF in the shape of strong ringing on the signal input of the receiver. For a large line inductance, the steepness of the signal edges does increase, but the ringing is unacceptable.

In contrast, the curve 3 shows the attenuating effect of a load capacitance 7 of 50 nF for a line inductance of 1 nH (the values 0 µH and 0 nH are not accepted by the simulation tool). In contrast, for a higher load capacitance 7 and lower line inductance 6, there is no ringing, but the edge steepness is too low.

In both cases, the distortion is caused by the frequency-dependent response of the lines or other sensors possibly connected in parallel with additional load capacitance.

The idea is now to compensate for these distorting line characteristics by a corresponding measure with respect to the phase and amplitude in advance already in the sensor (transmitter).

In actuality, the amplitude and phase of the third harmonic must correspond as much as possible to the desired values with respect to the first harmonic on the receiver input (even better on the input of the threshold circuit in the receiver).

Depending on the properties of the lines, the third harmonic at 375 kHz is adjusted with respect to the first harmonic at 125 kHz both in phase and also in amplitude to the desired target values.

Because only one additional frequency is used in addition to the first harmonic in the example described here, the problem is solved especially easily: for a real application, the magnitude and phase of the third harmonic will be adapted, e.g., empirically, so that the desired signal shape reaches the receiver.

Figure 3:
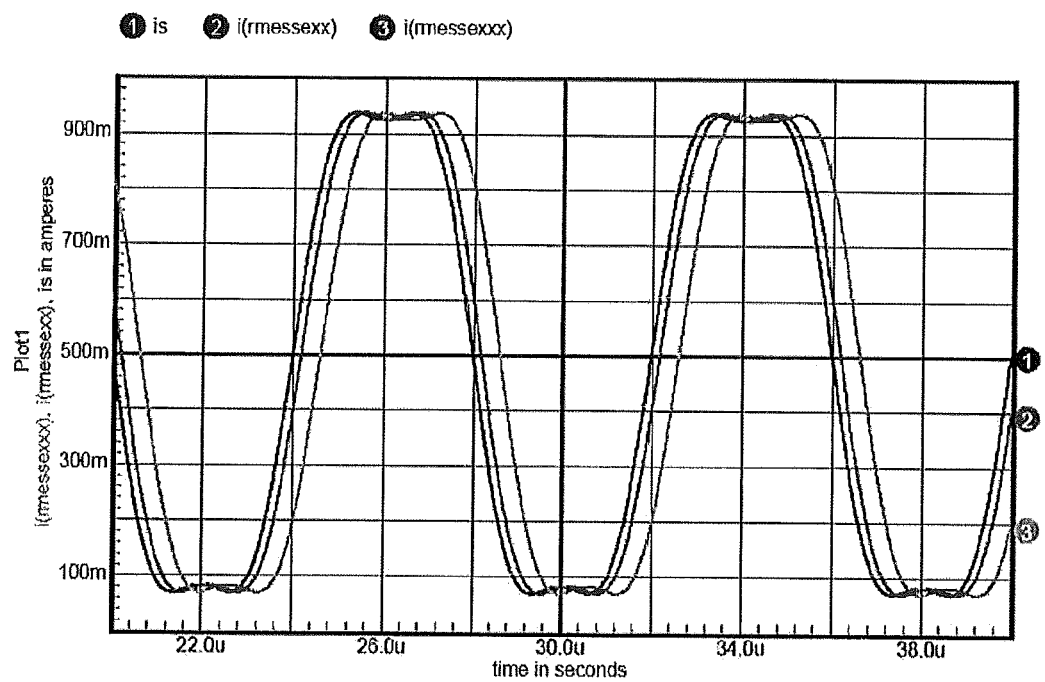
FIG. 3 is a graphic showing the optimization of the transmission current according to the invention.

FIG. 3 shows a graphic of the optimization of the transmission current according to the invention. The individual curves will be explained in more detail below.

The curve 1 shows, as a reference, the target value for the typical signal current on the receiver input.

The curve 2 shows the transmission current optimized for a line inductance of 10 µH and a load capacitance of 1 pF.

The curve 3 shows the transmission current optimized for a line inductance of 1 nH and a load capacitance of 50 nF.

The curve 2 and the curve 3 show that both a high line inductance and also a high load capacitance can be perfectly compensated.

The time offset of the curves in the figure above has no effect for the evaluation in the receiver.

Due to a signal form that is perfect for the evaluation in the receiver, the circuit can work with very low signal amplitudes, wherein the power loss and the voltage drop can be reduced.

If identical sensors are connected to different line impedance values, the correspondingly adapted curve shape can be selected automatically by means of the sensor address as a function of the sensor address. In contrast, if the adaption is performed with an RC element, this is possible only through a placement option. Then, however, the variation in the sensors would be required.

In principle, a reduction of the signal distortion is also still possible directly in front of the threshold circuit in the receiver. However, if the amounts of distortion in transmitters connected in parallel to a bus differ significantly, a synchronous switchover to the just active transmitter is required. It is also advantageous here when the rectification characteristics can be programmed individually for each transmitter.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

List of Reference Symbols

1 Power source
2 Power source
3 Resistor
4 Capacitor
5 Modulator
6 Total line inductance
7 Total line and load capacitance
8 Total resistance

The invention claimed is:

1. A method for reducing signal distortion in the transmission of binary coded signals in a motor vehicle, comprising the steps of:
    forming in a transmitter an edge of a binary coded signal by adapting a frequency and phase response of a first harmonic such that the signal distortion to be expected on the entire transmission line can be compensated.

2. The method for reducing signal distortion according to claim 1, wherein effects of signals from transmitters connected in parallel are compensated.

3. The method for reducing signal distortion according to claim 1, wherein effects of optional transmitters connected in parallel are compensated by correspondingly allocated tables, wherein a receiver control unit is provided that reports to the transmitter which table should be selected for the corresponding configuration.

4. The method for reducing signal distortion according to claim 3, wherein, in the table, instead of the desired signal shape, the derivation of the desired signal shape is stored and the original signal is reconstructed for output through an integration of the table values.

5. The method for reducing signal distortion according to claim 1, wherein the transmission signal is synthesized from a few discrete frequencies.

6. The method for reducing signal distortion according to claim 1, wherein, in addition to the first harmonic, an amplitude and phase of additional harmonics used in the signal are adjusted with respect to the first harmonic, so that the frequency and phase response of the transmission line is compensated.

7. The method for reducing signal distortion according to claim 1, wherein the synthesized edge shape is stored in a digital memory and is output by means of a DAC at each edge.

8. The method for reducing signal distortion according to claim 1, wherein an analog integrator is provided for reducing undesired frequency conversion products with the system clock of the DAC.

9. The method for reducing signal distortion according to claim 1, wherein distortion of the signals received on the receiver is rectified by a rectification circuit connected upstream of the threshold circuit.

10. The method for reducing signal distortion according to claim 9, wherein the rectification circuit can be programmed for different line properties, wherein for several transmitters connected in parallel, special programing can be allocated to each transmitter.

* * * * *